United States Patent
Glinz

[11] Patent Number: 5,361,819
[45] Date of Patent: Nov. 8, 1994

[54] PNEUMATIC VEHICLE TIRE HAVING WOUND LAYER INCLUDING WIDE AND NARROW STRIPS COVERING BELT

[75] Inventor: Michael Glinz, Neustadt, Germany

[73] Assignee: Continental Aktiengesellschaft, Hanover, Germany

[21] Appl. No.: 69,203

[22] Filed: May 28, 1993

Related U.S. Application Data

[62] Division of Ser. No. 822,448, Jan. 17, 1992, Pat. No. 5,252,156.

[30] Foreign Application Priority Data

Feb. 2, 1991 [DE] Germany ............................ 4103232

[51] Int. Cl.$^5$ ............................................... B60C 9/18
[52] U.S. Cl. ...................................... 152/531; 152/533
[58] Field of Search ................. 152/531, 533, 526; 156/117, 397

[56] References Cited

U.S. PATENT DOCUMENTS

| | | | |
|---|---|---|---|
| 4,815,514 | 3/1989 | Hara et al. | 152/531 |
| 5,117,887 | 6/1992 | Lukosch et al. | 152/533 |

FOREIGN PATENT DOCUMENTS

| | | | |
|---|---|---|---|
| 4015223 | 11/1990 | Germany | 152/533 |
| 5215 | 1/1991 | Japan | 152/533 |

*Primary Examiner*—Geoffrey L. Knable
*Attorney, Agent, or Firm*—Robert W. Becker & Associates

[57] ABSTRACT

A pneumatic vehicle tire with a wound bandage and a method for its manufacture are provided. In order to avoid discontinuities of the wound bandage within the area of the edges of the reinforcement belt, it is suggested to provide the strips of material for manufacturing the bandage with a narrow width in the area of the edges of the reinforcement belt and with a wide width at the center portion of the reinforcement belt. This is achieved by providing at least two strips of varying width and winding them onto the reinforcement belt such that the narrow strip of material is arranged at the edges of the reinforcement belt.

6 Claims, 5 Drawing Sheets

PNEUMATIC VEHICLE TIRE HAVING WOUND LAYER INCLUDING WIDE AND NARROW STRIPS COVERING BELT

This application is a division, of application Ser. No. 822,448 filed Jan. 17, 1992, U.S. Pat. No. 5,252,156.

BACKGROUND OF THE INVENTION

The present invention relates to a pneumatic vehicle tire having a radial carcass being anchored at the bead cores by being looped about the bead cores of the tire beads. The pneumatic vehicle tire further comprises a reinforcement belt connected radially outwardly to the radial carcass and a bandage, arranged radially outwardly of the reinforcement belt, for covering the reinforcement belt. The invention further relates to a method of manufacturing the aforementioned pneumatic vehicle tire.

Pneumatic vehicle tires are known in which a bandage for covering the reinforcement belt is comprised of strip-like cord material wound radially outwardly onto the reinforcement belt in various manners, for example, by having neighboring windings abutting one another, or by having neighboring windings with various degrees of overlap. Generally, in the area of the edges of the reinforcement belt, within the respective axially outwardly oriented portions of the tire tread, a tighter and stronger bandage effect is desired as compared to the center section of the tire tread so that in the area of the edges of the reinforcement belt the bandage is provided with greater overlap or with more layers than the center section. Furthermore, a technique is known in which two strips of material of the same width are wound at the same time onto a reinforcement belt for forming the desired bandage.

When a relatively small strip of material is used for manufacturing the bandage, the beginning of the bandage which, in general, lies within the area of the edges of the reinforcement belt as well as at the reversing point at the opposite edge in the case of a multi-layer bandage, has a relatively small discontinuity resulting from the uneven mass distribution over the reinforcement belt circumference and an uneven force effect onto the reinforcement belt at these locations. On the other hand, when using a narrow strip of material a disadvantageously increased manufacturing station time must be taken into account since a greater number of windings is required for the manufacture of the cover layer. When a wider strip is used for the bandage, the station time is reduced; however, the aforementioned discontinuities or disturbances at the edges of the reinforcement belts are increased.

It is therefore an object of the present invention to provide a pneumatic vehicle tire in which the discontinuities of the bandage at the edges of the reinforcement belt are small without increasing the station time for the manufacture of the bandage.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
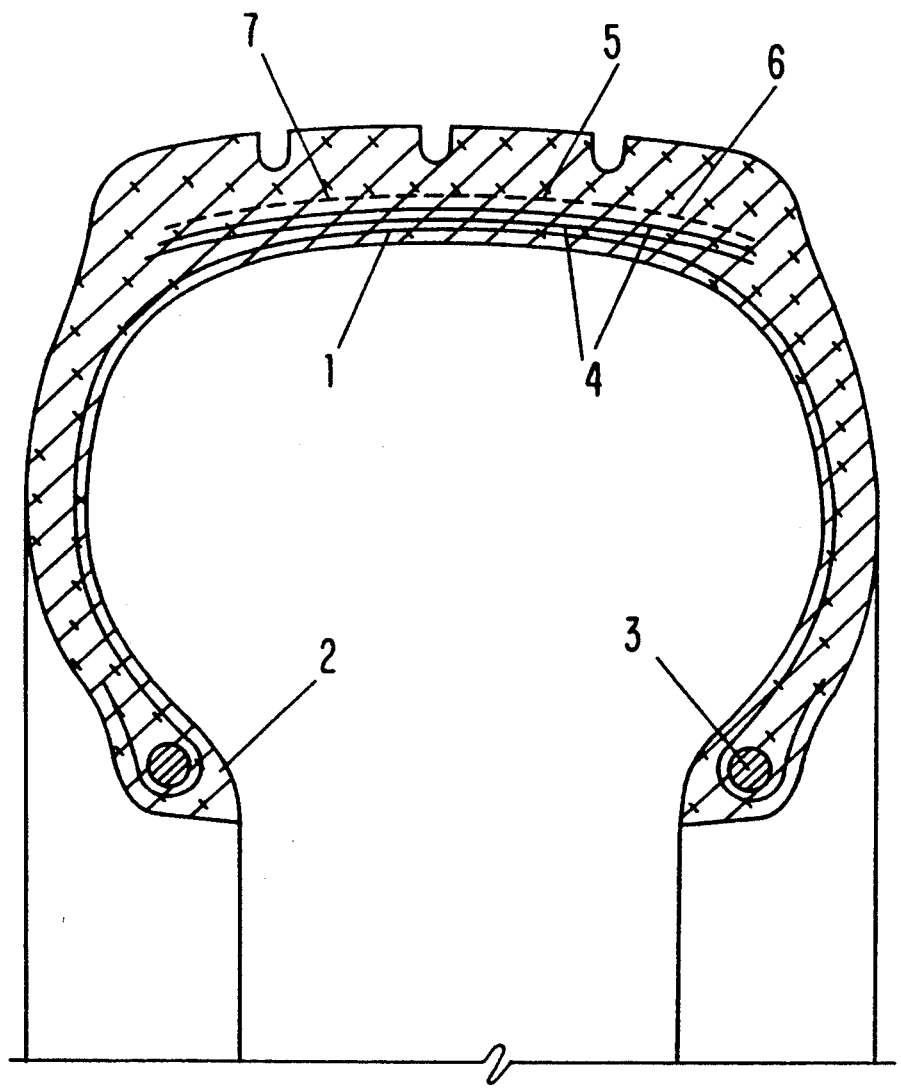
FIG. 1 shows a pneumatic vehicle tire with a wound bandage in a radial cross-section.

The pneumatic vehicle tire of the present invention is primarily characterized by a radial carcass; tire beads with pull resistant bead cores, with the radial carcass being anchored at the bead cores by being looped about the bead cores; a reinforcement belt connected radially outwardly to the radial carcass; and a bandage, arranged radially outwardly of the reinforcement belt for covering the reinforcement belt, the bandage being comprised of strips of material being wound onto the reinforcement belt in a circumferential direction of the vehicle tire, with the strips of material in areas of the edge of the reinforcement belt tire tread being narrower than the strips of material in a central section of the tire tread.

The method for producing the aforementioned pneumatic vehicle tire is primarily characterized by the following steps: Providing at least two of the strips of material of varying width, with a first one of the strips of material being narrow and a second one of the strips of material being wide; arranging the narrow strip of material in an area of edges of the reinforcement belt; placing the wide strip of material on a center portion of the tire tread; and simultaneously winding the narrow and the wide strips of material to form adjacent windings, respectively.

The gist of the invention lies in the fact that for generating the bandage a narrow strip is used within the area of the edges of the reinforcement belt while in the center portion a wide strip is used. This results in the advantage that, when applying the strips of material to the reinforcement belt under the same pulling force, the tension per thread and accordingly the pressure generated by the narrower strip in the lateral section of the reinforcement belt is greater.

In a preferred embodiment, the bandage is comprised of a first one of the strips of the material (cord material) of a narrow width and a second one of the strips of material of a wide width, whereby the first strip of material covers the edges of the reinforcement belt with a plurality of windings and the second strip of material covers the center portion of the reinforcement belt with a plurality of windings. Preferably, the first strip of material has a width of 4 to 8 mm and is applied in two to five windings, while the second strip of material has a width of 20 to 25 mm. It is expedient to apply the windings such that neighboring ones of the windings of the first strip of material abut one another or overlap one another. It is especially preferred that the width of the strips of material continuously increases from the edges of the reinforcement belt toward the center portion of the reinforcement belt. This may be expediently achieved by providing a basic strip from which the narrow and the wide strip of material are cut with the aid of a knife, whereby a relative movement between the knife and the basic strip occurs such that the narrow strip of material is produced alternatingly on the left and on the right side of the tire during the manufacturing process. Accordingly, it is possible to produce the two strips of material of varying width in a cutting process and simultaneously wind the so generated strips onto the reinforcement belt. This may be carried out such that, in a first step, the narrow strip of material is positioned at the left side of the reinforcement belt and the wide strip of material is positioned at the center of the reinforcement belt. Then the two strips of material are wound towards the right and subsequently displacing the knife relative to the basic strip so that the narrow strip becomes the wide strip and vice versa. Subsequently, in a second step, the winding is continued towards the right and thereby finishing the bandage.

In another preferred embodiment of the present invention, three strips of material are provided whereby the third strip of material is also a narrow strip, and the following steps are carried out: Simultaneously removing the three strips of material from respective storage spools, with the storage spool carrying the wide strip of material being arranged between the other two storage spools; and simultaneously winding the three strips of material onto the reinforcement belt.

With the aforementioned embodiments it is possible to wind the strips such that neighboring ones overlap if desired.

DESCRIPTION OF PREFERRED EMBODIMENTS

The present invention will now be described in detail with the aid of several specific embodiments utilizing FIGS. 1 through 7.

FIG. 1 shows a pneumatic vehicle tire with a radial carcass 1, which is anchored in the area of the tire beads 2 by being looped about the pull-resistant bead cores 3. Radially outwardly of the radial carcass 1, a commonly used reinforcement belt 4 is provided which, in the instant representation, is comprised of two layers. On top of the reinforcement belt 4, a covering bandage 5 is arranged which completely covers the reinforcement belt 4 and is generated in the form of a wound bandage from cord material strips of various widths. The bandage 5 is comprised of narrow strips of cord material 6 within the area of the two lateral sections of the reinforcement belt while in the area of the center portion of the reinforcement belt 4 a wider strip of cord material 7 is provided.

The narrow strip of cord material 6 may have a width of 4 to 8 mm while the wide strip of material 7 has suitably a width of 12 to 20 mm. The cord material may be comprised of threads made of nylon or a material sold under the trademark Kevlar by Du Pont these threads being coated with a rubber coating. The cord material preferably has a density of, for example, approximately 10 threads per 10 mm width of strip. The narrow strip of material 6 is provided in two to five windings in the area of the edges of the reinforcement belt 4.

Figure 2:
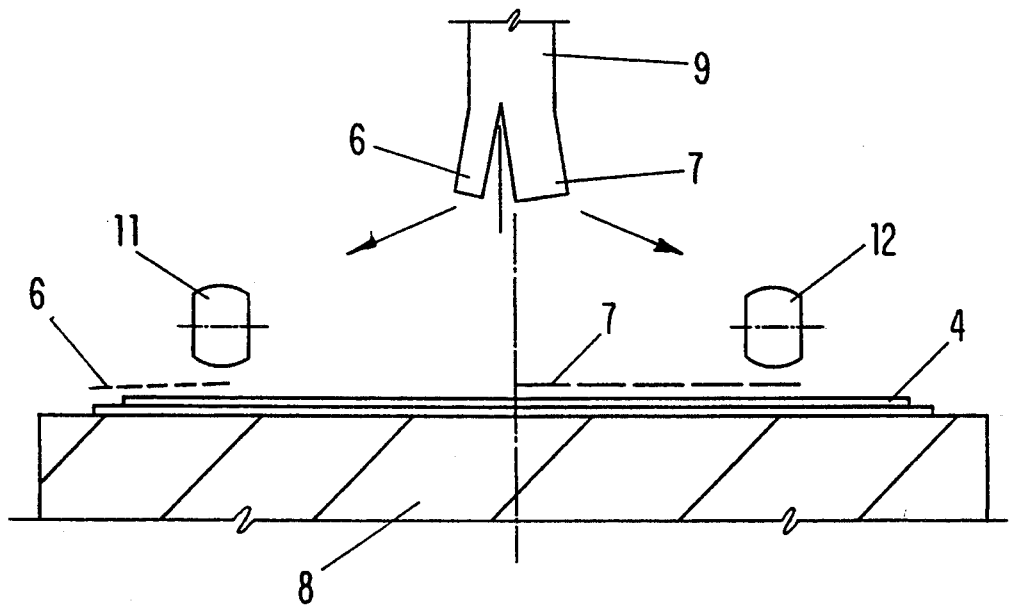
FIG. 2 shows a winding drum with a partially wound bandage in a schematic representation.
Figure 3:
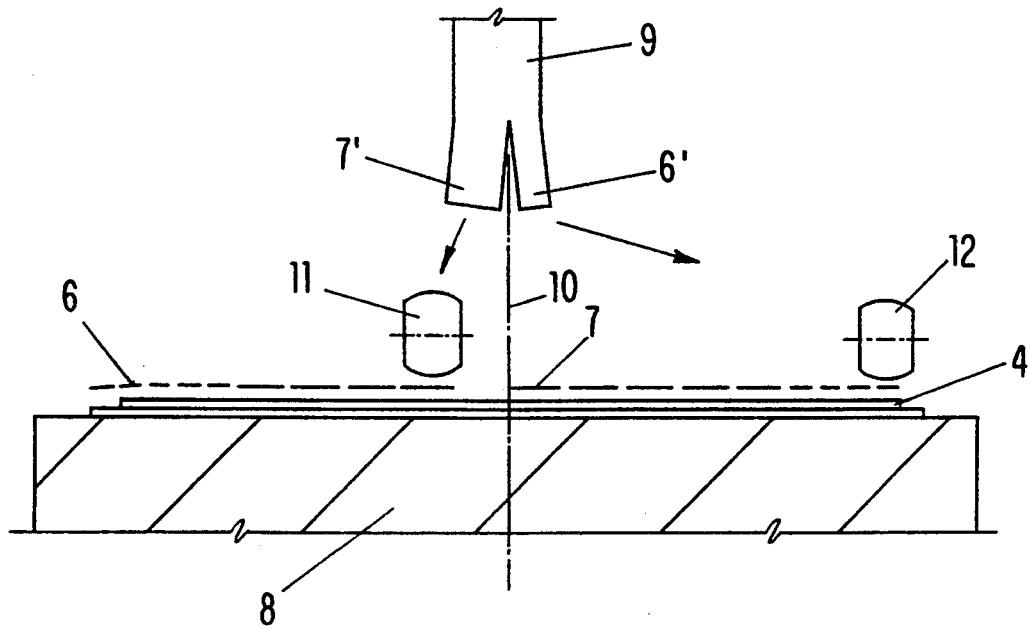
FIG. 3 shows the winding drum of FIG. 2 with a completed bandage in a schematic representation.

With the aid of FIGS. 2 and 3 the manufacture of the narrow strip of material 6 and the wide strip of material 7 as well as the application of the bandage 5 on the reinforcement belt 4 is demonstrated. FIG. 2 shows a reinforcement belt 4 on a winding drum 8. A basic strip 9 is removed from a storage spool, which is not represented in the drawing, and is then guided past a knife 10 which cuts the basic strip 9 into a left, narrow strip of material 6 and into a right, wide strip of material 7. The narrow strip of material 6 is fed to a first guide member 11 and from there to the winding drum 8. Accordingly, the wide strip of material 7 is fed to a second guide member 12 and then towards the winding drum 8.

The winding of the bandage 5 is carried out such that, simultaneously with the removal of the basic strip 9 and the cutting step into a narrow strip of material 6 and into a wide strip of material 7, the strip of material 6 is wound onto the left edge of the reinforcement belt 4 towards the right, while, at the same time, the strip of material 7 starting at the center of the reinforcement belt 4 is wound towards the right. In the shown example, the two strips of material 6, 7 are applied to the winding drum 8 in five windings. Then a switching of the position of the knife 10 takes place so that the wide strip of material 7' is now generated on the left side of the drawing and the narrow strip of material 6' is generated on the right side of the drawing. The wide strip of material 7' is guided via the first guide member 11 as a continuation of the narrow strip 6 and applied to the winding drum so that the free area of the left half of the reinforcement belt 4 is covered in five further windings up to the center of the reinforcement belt 4. At the same time, the right edge of the reinforcement belt 4 is covered with narrow strips of material 6 via the second guide member 12 in five further windings. Now a one-layer bandage 5 is completed. When a multi-layer bandage 5 is desired further layers are applied in two process steps by switching the position of the knife 10 as described above. Neighboring strips of material may abut or may overlap one another.

Figure 4:
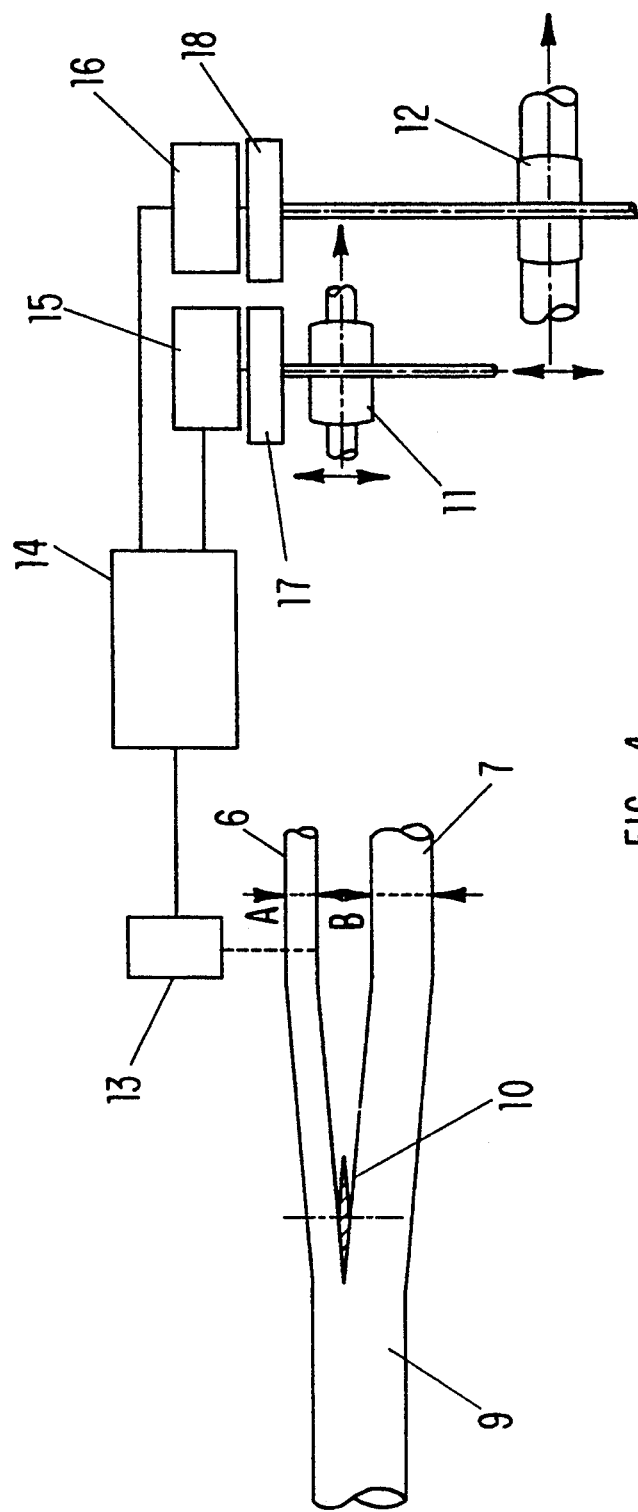
FIG. 4 shows a feeding device with a sensor for determining the width of the strip of material.

FIG. 4 shows a first embodiment of a feeding device in further detail. On the left side of the drawing the basic strip 9 is shown which is cut by the knife 10 into the narrow strip of material 6 and into the wide strip of material 7. A sensor 13, which may be an optical sensor, determines the width of the strip of material 6 whereby, with the aid of a measuring signal, respective control signals for the motors 15 and 16 are generated in a control unit 14 in order to control, for example, the advancing speed of the guide members 11, 12 in the axial direction of the tire. The motors 15 and 16 drive via respective gears 17, 18 the first guide member 11 and the second guide member 12. At the same time the advancing speed of the guide members 11 and 12 is controlled by the motors, whereby the second guide member 12 for the wider strip of material 7 is provided with a greater advancing speed than the first guide member 11.

Figure 5:
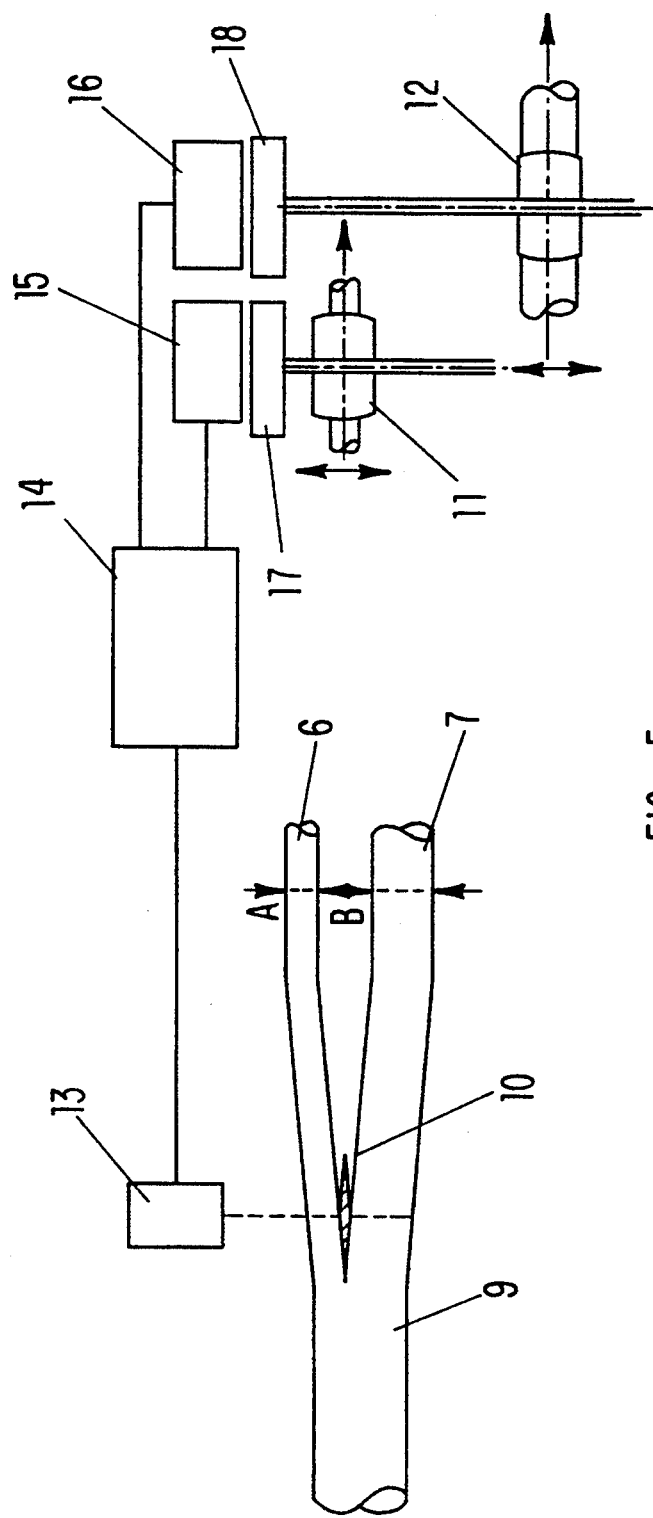
FIG. 5 shows in a schematic representation the feeding device according to FIG. 4 with a sensor for determining the position of the knife.

The feeding device represented in FIG. 5 corresponds essentially to the one of FIG. 4; however, the sensor 13 no longer determines the width of a strip, but the position of the knife 10.

Figure 6:
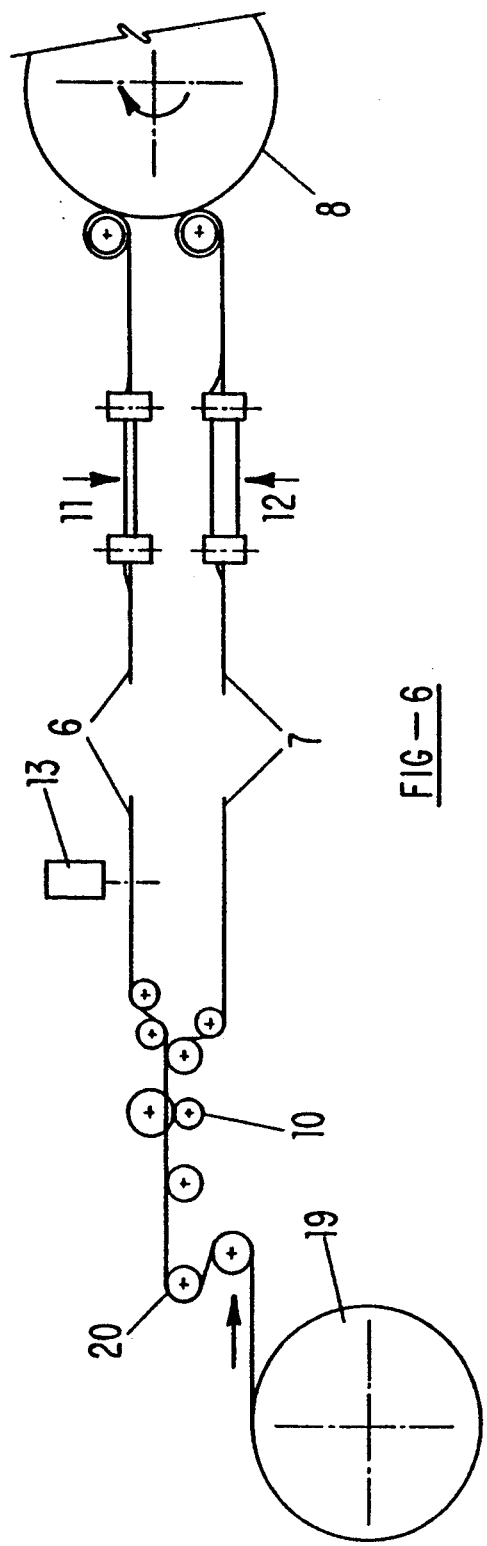
FIG. 6 shows a flow diagram of the materials in the manufacturing process.

FIG. 6 represents the flow diagram of the material used in the manufacturing process. The basic material 9 is fed via respective guide rollers 20 from a storage spool 19 to the knife 10 where the cutting step to form the narrow strip of material 6 and into the wide strip of material 7 takes place. The sensor 13 performs the same task as described above in the example of FIG. 4. The strips of material 6, 7 are fed via the guide members 11, 12 to the winding drum 8.

Figure 7:
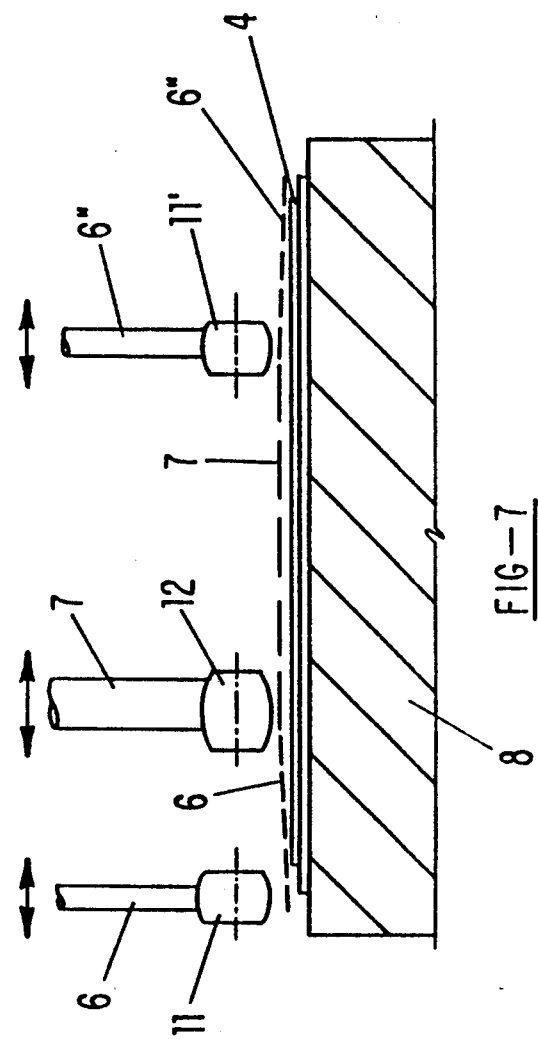
FIG. 7 shows a feeding device with three feeding rollers.

In the example of FIG. 7, three individual strips of material 6, 6", 7 ere supplied by three separate storage spools (not represented in the drawing) and are fed to three guide members 11, 11', 12 whereby the narrow strips of material 6, 6" are guided to a respective first guide member 11, 11' on the left and on the right while in the center a wide strip of material 7 is guided to a second guide member 12. The guide members 11, 11' and 12 ere arranged such relative to the winding drum 8 that a simultaneous removal and winding of the strips of material 6, 6" and 7 will form the desired bandage 5 whereby the narrow strips of materials 6, 6" are applied to the two edges of the reinforcement belt, while the wide strip of material 7 will cover the center section of the reinforcement belt 4. The three strips of material 6, 6", 7 are applied to the reinforcement belt 4 in the same winding direction, whereby, of course, the second guide member 12 for the wide strip of material 7 has a greater advancing speed than the two guide members 11 and 11'.

With the present invention it is also possible to provide a continuous adjustment of the width of the strips of material so that a strip of material for the bandage 5 within the area of the edges of the reinforcement belt 4 may have a narrow width, while the width is continuously increased towards the center of the reinforcement belt 4.

The present invention is, of course, in no way restricted to the specific disclosure of the specification and drawings, but also encompasses any modifications within the scope of the appended claims.

What I claim is:

1. A pneumatic vehicle tire, comprising:
   a radial carcass;
   tire beads with pull-resistant bead cores, with said radial carcass being anchored at said bead cores by being looped about said bead cores;
   a reinforcement belt connected radially outwardly to said radial carcass; and
   a bandage, arranged radially outwardly of said reinforcement belt, for covering said reinforcement belt, said bandage being comprised of strips of cord material coated with rubber being spirally wound onto said reinforcement belt in a circumferential direction of said vehicle tire to form adjacent windings, with said strips of cord material in areas of edges of said reinforcement belt being narrower than said strips of cord material in a central portion of said reinforcement belt.

2. A pneumatic vehicle tire according to claim 1, wherein said bandage is comprised of a first one of said strips of cord material of a narrow width and a second one of said strips of cord material of a wide width, said first strip of cord material covering said areas of said edges of said reinforcement belt with a plurality of windings and said second strip of cord material covering said central portion of said reinforcement belt with a plurality of windings.

3. A pneumatic vehicle tire according to claim 2, wherein said first strip of cord material has a width of 4 to 8 mm and is applied in 2 to 5 windings, and said second strip of cord material has a width of 20 to 25 mm.

4. A pneumatic vehicle tire according to claim 3, wherein neighboring ones of said windings of said first strip of cord material abut one another.

5. A pneumatic vehicle tire according to claim 3, wherein neighboring ones of said windings of said first strip of cord material overlap one another.

6. A pneumatic vehicle tire according to claim 1, wherein said strips of cord material at said areas of edges and said strips of cord material in said central portion are formed by one continuous strip of cord material and wherein a width of said continuous strip of cord material continuously increases from said areas of said edges of said reinforcement belt towards a center of said reinforcement belt.

* * * * *